UNITED STATES PATENT OFFICE.

TOM EDGAR RULE AND JAMES NICOL, OF LIVERPOOL, ENGLAND, ASSIGNORS TO ALFRED HENRY BONNARD, OF LONDON, ENGLAND.

PREPARATION OF VEGETABLE CHARCOAL.

1,250,228.     Specification of Letters Patent.     Patented Dec. 18, 1917.

No Drawing.     Application filed July 11, 1916. Serial No. 108,717.

*To all whom it may concern:*

Be it known that we, TOM EDGAR RULE and JAMES NICOL, subjects of the King of England, both residing at Liverpool, in Lancashire, England, have invented certain new and useful Improvements in the Preparation of Vegetable Charcoal, of which the following is a specification.

This invention is for improvements in or relating to the preparation of vegetable charcoal to be particularly employed in connection with sugar refinery and in clarifying and other treatment of oils, fats, and other substances.

This invention consists in a process for preparing vegetable charcoal by heating in a retort without the addition of water or steam, a carbonaceous material of vegetable origin and an alkaline-earth metal supplied in the form of a carbonate, the two substances being mixed together and heated with the air excluded to such temperature (about 1000° C.) and for such time that carbon monoxid is given off from the vent of the retort, whereby a charcoal is produced which is more than ten times as active as animal charcoal produced by ordinary methods.

It has previously been proposed to produce a "black" for coloring purposes or for decolorizing sugar, by heating lime (slaked or otherwise), or carbonate of lime, mixed with tar, coal, blood, molasses, gelatin, etc., to a "red heat", which is about 700° C., and when cool to wash this mixture with muriatic acid. It has further been proposed to produce a decolorizing charcoal from wood shavings mixed wet with chalk or slaked lime and retorted to a red heat, which again would be about 700° C. After cooling, the mixture was to be washed with hydrochloric acid and finally with water, after which it might be heated again to incandescence, but this would be after the lime had been washed away by the hydrochloric acid. Instead of lime or chalk, other analogous compounds have been suggested. Magnesium oxid, barium oxid, magnesium carbonate, barium carbonate or combinations of lime or chalk with such analogous compounds, or with the chlorids of magnesium, barium or silicon, or of these with calcium chlorid. Again, it has been proposed to make a hard desulfurized coke by mixing coal with carbonate of calcium and retorting it at a temperature of about 900° C. or even above that, but no suggestion has been made to use coke as a decolorizing agent.

Further, it has been proposed to revivify animal carbon by mixing with it quick-lime (calcium oxid) in the proportion of 1% to 3% by weight of lime to weight of carbon and subjecting the mixture to the usual calcining process which is carried out at approximately 700° C. This temperature is too low to produce the results obtained according to the present invention and the proportion of lime is far too small.

Another method proposed for revivifying carbon of a vegetable origin is to treat it with solutions, of a strength ranging from 1% to 25%, having an alkaline reaction and then heating the mixture to red heat or incandescence; an oxidizing agent may also be mixed with the alkaline solution. We have found it impossible to produce a carbon of the activity obtainable by this invention when the alkaline earth metal is mixed with water; moreover the solution proposed in this alkaline revivifying process again contains far too little alkaline material to produce the results obtained by the present invention.

It has been found that by raising the mixture of carbonaceous material of vegetable origin and carbonate of an alkaline earth metal (for example calcium) to the temperature of 1000° C., or even greater, a far more active charcoal is obtainable than is possible at lower temperatures, and no water or steam should be intermixed with the said charcoal-producing substances.

A preferred method of carrying out this invention in detail, consists in mixing sawdust, woodchips or the like, or any other vegetable substance convertible into adequate quantities of carbon with preferably not less than 30% by weight of chalk. The mixture is then raised to a bright red heat or thereabout, say 1000° C., the air being excluded, and this degree is maintained for an hour or less.

As already stated a temperature of about 1000° C. is required for effecting the necessary change and as a means of defining this approximate temperature the discharge of carbon-monoxid from the vent of the retort may be utilized as an index that the process is completed. If the process is stopped when carbon monoxid is first given off, the activity of the charcoal will be less than that of charcoal produced after a free discharge has taken place.

The material is then washed with hydrochloric acid until free from lime salts, and finally washed with water to free it from acid. After this it is dried and is then ready for the market.

It will be appreciated that any carbonaceous materials of vegetable origin may be used in the manufacture of this charcoal other than those mentioned, for instance, ordinary wood charcoal obtained in commerce may be mixed with the chalk instead of a vegetable substance which has not been carbonized prior to treatment according to the present invention. When mixing charcoal direct with the chalk or other carbonate of an alkaline earth metal, the proportions of the second ingredient relatively to the charcoal must not be less than 10% as will be readily understood, because the charcoal is already relatively pure carbon, whereas this is not the case with the sawdust or woodchips.

What we claim as our invention and desire to secure by Letters Patent is:—

1. A process for preparing vegetable charcoal consisting in heating in a retort without the addition of water or steam a carbonaceous material of vegetable origin and an alkaline earth metal supplied in the form of a carbonate, the two substances being mixed together, and heated with the air excluded to such temperature (about 1000° C.) and for such time that carbon monoxid is given off from the vent of the retort, whereby a charcoal is produced which is more than ten times as active as animal charcoal produced by ordinary methods.

2. A process for preparing vegetable charcoal consisting in heating in a retort without the addition of water or steam a carbonaceous material of vegetable origin and an alkaline earth metal supplied in the form of a carbonate, the two substances being mixed together, heated with the air excluded to such temperature (about 1000° C.) that carbon monoxid is given off from the vent of the retort, and maintaining this temperature for approximately one hour, whereby a charcoal is produced which is more than ten times as active as animal charcoal produced by ordinary methods.

3. A process for preparing vegetable charcoal consisting in heating in a retort without the addition of water or steam a carbonaceous material of vegetable origin and carbonate of calcium, the two substances being mixed together, and heated with the air excluded to such temperature (about 1000° C.) and for such time that carbon monoxid is given off from the vent of the retort, whereby a charcoal is produced which is more than ten times as active as animal charcoal produced by ordinary methods.

4. A process for preparing vegetable charcoal consisting in heating in a retort without the addition of water or steam a carbonaceous material of vegetable origin and 10% by weight, relatively to the amount of carbon contained in the carbonaceous material, of an alkaline earth metal supplied in the form of a carbonate, the two substances being mixed together, and heated with the air excluded to such temperature (about 1000° C.) and for such time that carbon monoxid is given off from the vent of the retort, whereby a charcoal is produced which is more than ten times as active as animal charcoal produced by ordinary methods.

5. A process for preparing vegetable charcoal consisting in heating in a retort without the addition of water or steam a carbonaceous material of vegetable origin and 10% by weight, relatively to the amount of carbon contained in the carbonaceous material, of carbonate of calcium, the two substances being mixed together, and heated with the air excluded to such temperature (about 1000° C.) and for such time that carbon monoxid is given off from the vent of the retort, whereby a charcoal is produced which is more than ten times as active as animal charcoal produced by ordinary methods.

6. A process for preparing vegetable charcoal consisting in heating in a retort without the addition of water or steam a carbonaceous material of vegetable origin and 30% by weight, relatively to the whole of the carbonaceous material, of an alkaline earth metal supplied in the form of a carbonate, the two substances being mixed together, and heated with the air excluded to such temperature (about 1000° C.) and for such time that carbon monoxid is given off from the vent of the retort, whereby a charcoal is produced which is more than ten times as active as animal charcoal produced by ordinary methods.

7. A process for preparing vegetable charcoal consisting in heating in a retort without the addition of water or steam a carbonaceous material of vegetable origin and 30% by weight, relatively to the whole of the carbonaceous material, of carbonate of calcium, the two substances being mixed together, and heated with the air excluded to such temperature (about 1000° C.) and for such time that carbon monoxid is given off from the vent of the retort, whereby a charcoal is produced which is more than ten times as active as animal charcoal produced by ordinary methods.

8. A process for preparing vegetable charcoal consisting in heating in a retort without the addition of water or steam a carbonaceous material of vegetable origin and an alkaline earth metal supplied in the form of a carbonate, the two substances being
5 mixed together, and heated with the air excluded to such temperature (about 1000° C.) and for such time that carbon monoxid is freely given off from the vent of the retort, whereby a charcoal is produced which is
10 more than ten times as active as animal charcoal produced by ordinary methods.

In testimony whereof we have signed our names to this specification in the presence of two subscribing witnesses.

TOM EDGAR RULE.
JAMES NICOL.

Witnesses:
H. R. RIEDY,
J. T. MIDDLETON.